US009423264B2

(12) United States Patent
Hansen

(10) Patent No.: US 9,423,264 B2
(45) Date of Patent: Aug. 23, 2016

(54) NAVIGATION SYSTEM

(71) Applicant: Harman Becker Automotive Systems GmbH, Karlsbad (DE)

(72) Inventor: Lars Hansen, Munich (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 139 days.

(21) Appl. No.: 13/773,180

(22) Filed: Feb. 21, 2013

(65) Prior Publication Data
US 2013/0218459 A1 Aug. 22, 2013

(30) Foreign Application Priority Data

Feb. 22, 2012 (EP) .................................. 12001177

(51) Int. Cl.
*G01C 21/32* (2006.01)
*G08G 1/07* (2006.01)
*G01C 21/36* (2006.01)

(52) U.S. Cl.
CPC ....... *G01C 21/3632* (2013.01); *G01C 21/3655* (2013.01)

(58) Field of Classification Search
CPC .......... G01C 21/3632; G01C 21/3655; G01C 21/3415; G01C 21/3492; G01C 21/3658; G08G 1/07; G08G 1/164; B60Q 5/00; B60Q 9/00
USPC .................. 701/119, 428, 533; 340/909, 438
See application file for complete search history.

(56) References Cited

U.S. PATENT DOCUMENTS

| | | | | |
|---|---|---|---|---|
| 7,649,444 B1* | 1/2010 | Fear | ......................... | B60Q 5/00 340/384.1 |
| 2005/0149262 A1* | 7/2005 | Oikubo | .............. | G01C 21/3658 701/431 |
| 2006/0217879 A1* | 9/2006 | Ikeuchi | .................. | G01C 21/32 701/409 |
| 2008/0183376 A1* | 7/2008 | Knockeart | ......... | G01C 21/3415 701/119 |
| 2008/0228826 A1* | 9/2008 | Dorum | .............. | G06F 17/30241 |
| 2009/0212973 A1* | 8/2009 | Namikawa | ............... | G08G 1/07 340/909 |
| 2010/0057336 A1* | 3/2010 | Levine | .................... | G01C 21/32 701/532 |
| 2010/0250116 A1* | 9/2010 | Yamaguchi | ........ | G01C 21/3644 701/533 |
| 2010/0299065 A1* | 11/2010 | Mays | ..................... | G01C 21/20 701/533 |
| 2011/0184641 A1* | 7/2011 | Arie | .................... | G01C 21/3658 701/533 |
| 2012/0095646 A1* | 4/2012 | Ghazarian | ............... | G01S 19/17 701/36 |
| 2012/0101727 A1* | 4/2012 | Mays | ................... | G09B 29/106 701/533 |
| 2012/0265435 A1* | 10/2012 | Yu | ...................... | G01C 21/3415 701/423 |

FOREIGN PATENT DOCUMENTS

| | | |
|---|---|---|
| EP | 1544829 | 6/2005 |
| EP | 1912043 A1 | 4/2008 |
| JP | 2004 333467 | 11/2004 |
| JP | 2008 002965 | 1/2008 |

OTHER PUBLICATIONS

European Search Report from corresponding European Patent Application No. EP 12001177.0, 8pgs., Jul. 24, 2012.

* cited by examiner

*Primary Examiner* — Yuri Kan
(74) *Attorney, Agent, or Firm* — Artegis Law Group, LLP

(57) ABSTRACT

A navigation system (NS) can determine a junction between a current position of a user and a maneuver point of a route. Additionally, the NS can determine, change, and output an explicit notification not to turn at the junction.

22 Claims, 3 Drawing Sheets

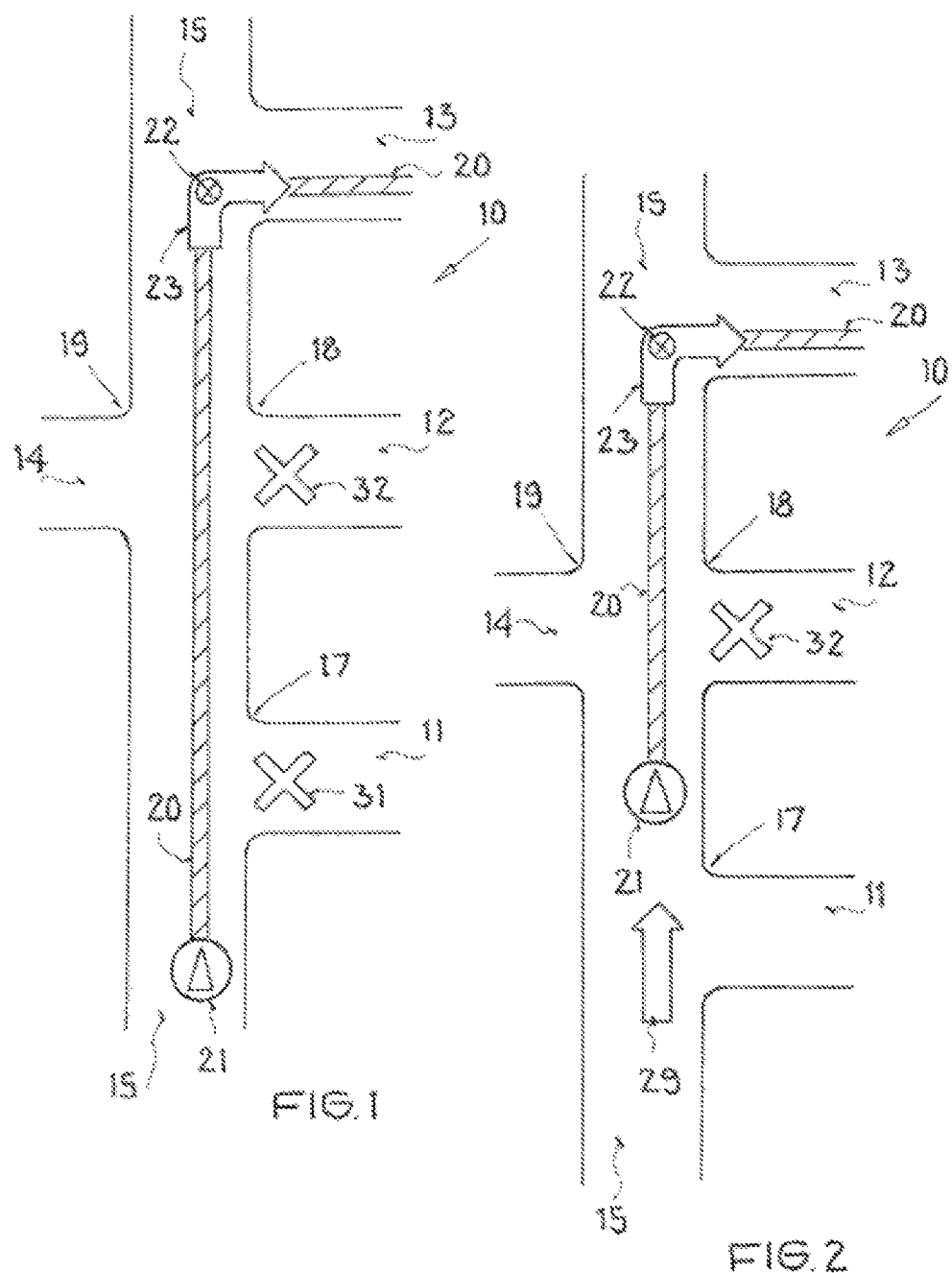

NAVIGATION SYSTEM

PRIORITY CLAIM

This application claims the benefit of priority from European Patent Application No. EP12001177.0, filed Feb. 22, 2012, which is incorporated by reference.

BACKGROUND OF THE INVENTION

1. Technical Field

The present invention relates to navigation systems.

2. Related Art

Navigation systems are electronic systems that can assist in navigation. Navigation systems may be embedded and/or attached to a vehicle or vessel, or may be located remotely with respect to a vehicle or vessel, for example. Navigation systems have become widespread and can even be found in handheld mobile devices, such as smartphones.

SUMMARY

Example navigation systems may use various technologies to determine, change, and/or output an explicit notification not to turn at a junction. The junction being an area where roads merge, diverge, or intersect, for example. Also, a junction may be between a current position of an NS user and a maneuver point of a route. The explicit notification may be a graphical flag, an audio alert, and/or a tactile alert, for example.

Other systems, methods, features and advantages may be, or may become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The NS may be better understood with reference to the following drawings and description. The components in the figures are not necessarily to scale, emphasis instead being placed upon illustrating the principles of the NS. Moreover, in the figures, like referenced numerals designate corresponding parts throughout the different views.

FIG. 1 illustrates an example map section.

FIG. 2 illustrates another example map section.

DETAILED DESCRIPTION

Figure 3:
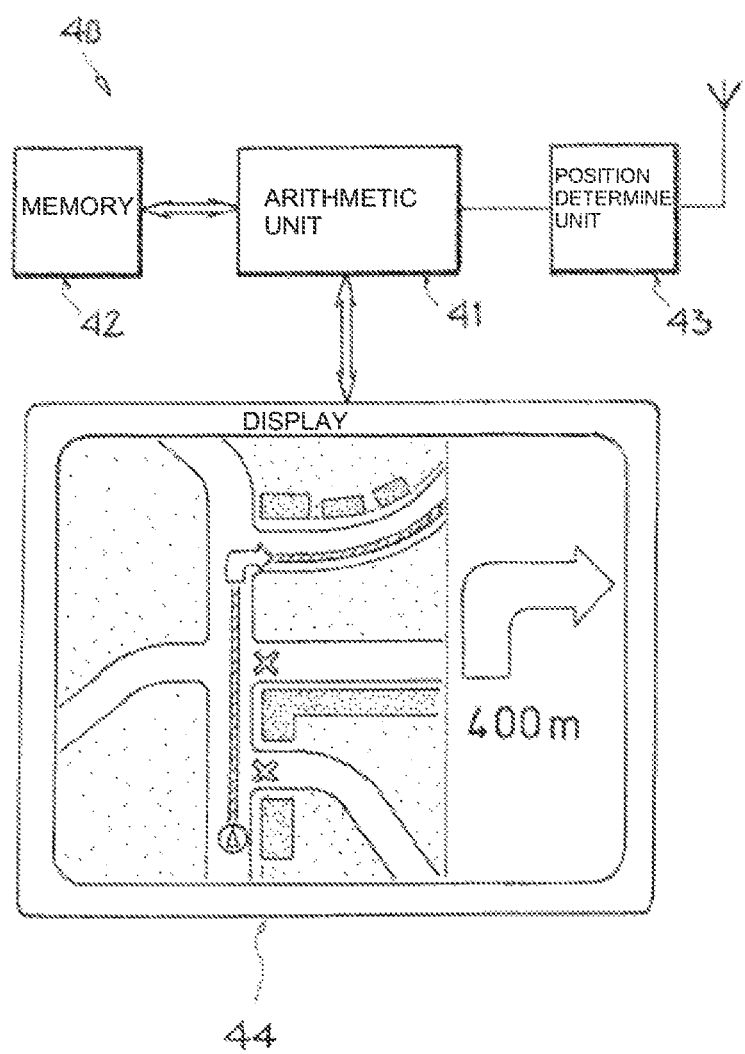
FIG. 3 illustrates an example NS.

It is to be understood that the following description of examples of implementations are given only for the purpose of illustration and are not to be taken in a limiting sense. The partitioning of examples in function blocks, modules or units illustrated in the drawings is not to be construed as indicating that these function blocks, modules or units are necessarily implemented as physically separate devices or a single physical device. Functional blocks, modules or units illustrated or described may be implemented as separate devices, circuits, chips, functions, modules, or circuit elements. One or more functional blocks, modules, or units may also be implemented in a common circuit, chip, circuit element or device.

Described herein, is a navigation system (NS) for determining and/or outputting an explicit notification not to turn at a junction. The junction being an area where roads merge, diverge, or intersect, for example. Also, the junction may be between a current position of an NS user and a maneuver point of a route (such as a point to exit a road or a point to turn onto another road). The explicit notification may be a graphical flag (such as a basic shape or symbol on a map), an audio alert (such as a short phrase or sound), and/or a tactile alert (such as a short vibration), for example.

In one example of the NS, the NS may include a processor, such as a central processing unit of a local or remote computer that may provide an alert to a driver who is driving in an incorrect direction. This may be done by determining a position of a vehicle, calculating a driving route of the vehicle, determining a driving maneuver in accordance with the calculated driving route, outputting indications relating to the determined driving maneuver to a driver of the vehicle, and alerting the driver when the vehicle is being driven in the wrong direction.

In an example operation, a route may be determined by a processor and the route may be displayed on a map on an electronic display. A maneuver point of the route may also be determined by the processor and a maneuver instruction for the maneuver point may be outputted by the display. A current position of the vehicle along the route may be displayed by a position symbol on the map.

A junction may be determined by a processor between the position symbol and the maneuver point on the route. A road branching off the route at the junction may also be determined by the processor. Further, one or more junctions may be determined between the position symbol and the maneuver point on the route.

The road branching off the route may be notified by an explicit notification, such as a flag on a map, an audio alert, and/or tactile alert. For example, where there are junctions, each road of each junction may be marked by a flag on a map. A flag may be any simple graphical element, such as a basic geometric shape or symbol. For example, a flag may be a cross, circle, oval, triangle, square, rectangle, octagon, or any other type of polygon.

The vehicle passing the junction may also be determined by the NS, and the explicit notification, such as a flag on a map, may be changed as a function of the vehicle passing the junction. The explicit notification may also be changed before reaching the maneuver point, for example.

The explicit notification provides a driver additional orientation as to when or where the driver may leave a current road. For example, by changing the explicit notification such as a flag on a map, the driver may compare the flag position on the map with vehicle surroundings.

The NS may include an arithmetic unit, a position determining unit that may be connected to the arithmetic unit, memory that may be connected to the arithmetic unit, and a display that may be connected to the arithmetic unit.

The position determining unit may be configured to determine a current position of the vehicle and/or the user.

The arithmetic unit may be configured to determine a route based on road data stored in the memory. The arithmetic unit and display may be configured to display the route on a map.

The arithmetic unit may be configured to determine a maneuver point of the route. The arithmetic unit and the display may be configured to output a maneuver instruction for the maneuver point, such as outputting the instruction to the display.

The arithmetic unit and the display may be configured to display the current position on the route by a position symbol on the map.

The arithmetic unit may be configured to determine a junction between the position symbol, the maneuver point on the route, and/or a road branching off of the route at a junction.

The arithmetic unit and the display may be configured to present an explicit notification, such as displaying the explicit notification at a junction. Also, the arithmetic unit and the position determining unit may be configured to determine when a vehicle passes the junction. The arithmetic unit and the display may be configured to change the explicit notification, such as changing a color included in a flag on a map, as a function of the vehicle passing the junction. The explicit notification may be changed before reaching the maneuver point.

A processing aspect of the NS may determine a route from a starting point to a destination point. The route may be a list, such as an ordered list, of path points that describe the path from the starting point to the destination point. Where route guidance requests that the driver make a turn from a road, a maneuver point for the turn may be determined by the processing aspect. A route may include one or more maneuver points.

A maneuver instruction for a maneuver point may include an audio and/or graphical output. For example, an arrow representation may be used as a maneuver instruction on a map.

The position symbol displayed on the map may include an arrow, for example. Alternatively, the position symbol may include a graphic of a vehicle. The position symbol provides for a driver to visualize the vehicle's current position on a map, the current position being determined from a coordinate that is obtained, for example, from a global positioning system (GPS).

A road may be any area that may be used for traffic. For example, a road may be a city street, country road, walking path, highway, bicycle path, and/or the like. A junction is understood to be a part or opening of a road where a turn, merge, or exit can be made. For example, intersections and road entrances or exits, such as highway entrances or exits, are junctions.

A flag may be displayed by as a flag graphic. Alternatively or additionally, a flag may be presented by audio output or tactile output. A flag graphic may be advantageously displayed at a graphical representation of a junction of a road, for example. The flag graphic may be displayed as an element on a representation plane above the road. The flag graphic, for example, may resemble a graphic found on a road sign that may be appropriate for the location of the flag. For example, a construction sign graphic may be used as the flag graphic when the flag is displayed at an intersection where construction is being done. The flag graphic may also be a coloring of the road or a gap in the road graphic, for example. Different flag graphics can be combined with each other and/or any other type of explicit notification, such as an audio alert and/or a short vibration.

An explicit notification, such as a flag, may be changed as a function of passing by the area associate with the notification. For example passing the area associated with a flag may result in the hiding or deleting the flag. Alternatively, the flag may change in size, shape, or color, upon passing the associated area.

In one example, where a right turn is given at a maneuver point, the road of the preceding junction may be marked by a flag where the road permits a right turn. If the road permits only a left turn, on the other hand, no flag may be displayed. Where a left turn is provided at a maneuver point, the road of the preceding junction may be marked by the flag where the road permits a left turn. If the road permits only a right turn, on the other hand, no flag may be displayed. Depending on the maneuver instruction being a left turn or right turn, flags of junctions on either side preceding the maneuver point may be different. Alternatively, identical flags may appear on both sides. The system may be set to limit a number of flags displayed at a time. Each time a junction is passed, a new flag may be set marking a new junction until the maneuver point is reached.

At least one additional junction may be determined between the maneuver point and a following maneuver point on the route. An additional road branching off the route at the additional junction may be determined. In an example, the additional road may be emphasized by an additional flag on a map or by any other type explicit notification. For example, the additional flag may be set before reaching the maneuver point. The at least one additional junction may be adjacent to the maneuver point.

One or more junctions may be determined between a position symbol and a maneuver point. One or more roads may be determined that are associated with the junction(s). Each road may be marked by a flag on the map, for example. In such an example, roads between the maneuver point and the position symbol may be marked by the flag when a number of roads between the position symbol and the maneuver point drops below a threshold and/or when a distance between the position symbol and the maneuver point drops below a distance threshold. This functionality can also apply to other types of explicit notifications besides flags.

In an embodiment, the passing may be determined by comparing, such as continuously comparing, a coordinate of the current position with a junction. For example, if the coordinate of the current position is located before a junction point of the junction in the direction of travel along the route, passing may have not taken place. If the coordinate of the current position is located after the junction point of the junction in the direction of travel along the route, the passing may have taken place.

FIG. 1 illustrates an example map section. Depicted is a view of a section of a map 10, which may be presented by a navigation system (NS). The section of the map 10 shows roads 11, 12, 13, 14, 15 and turns 17, 18, 19, whereby the roads 11, 12, 13 and 14 branch off the road 15.

A section of a calculated route 20 is illustrated on the map 10. Route 20 may include geographic points, which may be approached in a defined order. Route 20 has a maneuver point 22, which is illustrated in FIG. 1 but which may not be displayed in the map. As an example, a maneuver instruction 23 in the form of a directional arrow is displayed in the map 10. The maneuver instruction 23 is associated with the maneuver point 22. Additionally or alternatively, a maneuver instruction may include other audio or graphical outputs, for example a voice output or a zoom in showing a map view of the junction of the maneuver. A position symbol 21 is displayed in the map 10. The position of position symbol 21 on the map 10 may be determined based on received GPS satellite signals.

Flags 31 and 32 may assist in helping the user avoid turning off before maneuver 23. Flags 31 and 32 are used to point out that the driver should not turn at the junctions 11 and 12 located before maneuver point 22. Flags 31 and 32 are set at road 11 and 12 on map 10. Flags 31 and 32 may be removed as soon as the vehicle has passed them.

A second vehicle position is illustrated on map 10 in the illustration in FIG. 2. In FIG. 2, the position of position symbol 21 is located between road 11 and road 12, so that the vehicle has already passed road 11. Completed passing is indicated by arrow 29.

Flag 31 on road 11 on map 10 is changed when passing 29 occurs. The flag 31 is changed by hiding flag 31, as indicated in FIG. 2. A driver of a vehicle may verify the passing at junction 17 coincidentally with the hiding of flag 31. After another passing at further junction 18, further flag 32 may also be hidden (not illustrated in FIG. 2), so that the driver may easily visualize a proposed turn onto road 13.

An example block diagram of an example navigation system 40 is depicted in FIG. 3. The navigation system 40 has a display 44, such as a touchscreen display and/or a projected display. The navigation system 40 also has an arithmetic unit 41, memory 42, and a position determining unit 43. The arithmetic unit 41 may be a signal and/or data processor or a microcontroller, for example. The position determining unit 43 may be GPS navigation device. The memory 42 may be a hard disk or a semiconductor memory. The information stored in the memory may be organized by a database. In this example, the arithmetic unit 41 is connected to the memory 42, the display 44, and the position determining unit 43.

The position determining unit 43 may be configured to determine a current position. The arithmetic unit 41 may be configured to determine a route, such as route 20, based on road data stored in the memory 42. The display 44 may be configured to display the route on a map, such as map 10.

The arithmetic unit 41 may also be configured to determine a maneuver point, such as maneuver point 22, on the route. The display may be configured to output a maneuver instruction, such as maneuver instruction 23, for the maneuver point. The display may also be configured to display the current position of the vehicle on the route. The current position can be symbolized by a position symbol on the map, such as the position symbol 21.

The arithmetic unit 41 may also be configured to determine one or more junctions, such as junctions 17 and 18, between the position symbol and the maneuver point on the route. The arithmetic unit 41 may also be configured to determine one or more roads, such as roads 11 and 12, branching off the route at the junction(s). The arithmetic unit 41 may also be configured to mark the road(s) by one or more flags, such as flags 31 and 32, on the map. The display 44 may output the flag(s).

The arithmetic unit 41 may also be configured to determine a passing, such as a passing 29, at the junction(s). The position determining unit 43 may be configured to determine a coordinate. The arithmetic unit 41 can compare database entries in memory 42 with the coordinate. The arithmetic unit 41 may also be configured to change the flag(s) on the map as a function of the passing.

The navigation system 40 may give the driver a determined amount of lead time to initiate a turning maneuver, and the flags visually present to the driver roads prior to a proposed turn. The presentation of the flags may deter a user from making a premature turn prior to the proposed turn. For example, turns 17 and 18 are marked by flags 31 and 32, which are crosses, so that it is apparent that the driver should not turn at these points according to the determined route.

In one example, the NS may limit the number of explicit notifications, such as the example flag(s) of FIGS. 1 and 2, to a fixed or adjustable amount. For example, explicit notifications may be limited to the roads of the last ten junctions preceding the maneuver point.

Figure 4:
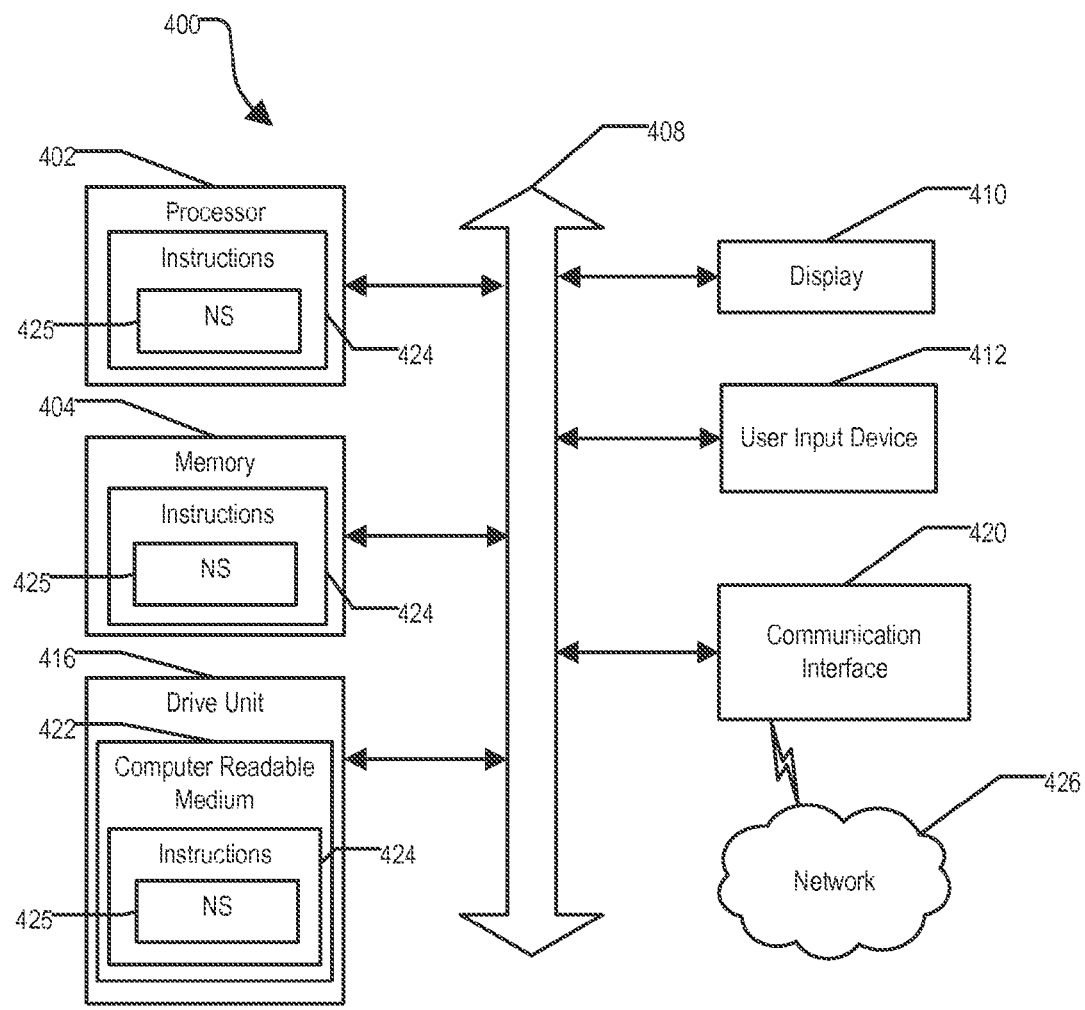
FIG. 4 illustrates an example block diagram of an example computer system that may be included or used with an aspect of an example NS.

Furthermore, the NS, one or more aspects of the NS, or any other device or NS operating in conjunction with the NS may include a portion or all of one or more computing devices of various kinds, such as the computer system 400 in FIG. 4. The computer system 400 may include a set of instructions that can be executed to cause the computer system 400 to perform any one or more of the methods or computer based functions disclosed herein. The computer system 400 may operate as a standalone device or may be connected, such as, using a network, to other computer systems or peripheral devices.

The computer system 400 may be implemented using electronic devices that provide voice, audio, video or data communication. While a single computer system 400 is illustrated, the term "system" may include any collection of systems or sub-systems that individually or jointly execute a set, or multiple sets, of instructions to perform one or more computer functions.

The computer system 400 may include a processor 402, such as a central processing unit (CPU), a graphics processing device (GPU), a digital signal processor, or some combination of different or the same processors. The processor 402 may be a component in a variety of systems. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually or programmed.

The term "module" may be defined to include executable modules. The modules may include software, hardware, firmware, or some combination thereof executable by a processor, such as processor 402. Software modules may include instructions stored in memory, such as memory 404, or another memory device, that may be executable by the processor 402 or other processor. Hardware modules may include various devices, components, circuits, gates, circuit boards, and the like that are executable, directed, or controlled for performance by the processor 402.

The computer system 400 may include a memory 404, such as a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 404 may include a cache or random access memory for the processor 402. In alternative examples, the memory 404 may be separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described may be performed by the programmed processor 402 executing the instructions stored in the memory 404. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

A computer readable medium or machine readable medium may include any non-transitory memory device that may include or store software for use by or in connection with an instruction executable system, apparatus, or device. The machine readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible medium upon which software is stored. The software may be electronically stored as an image or in another format (such as through an optical scan), then compiled, or interpreted or otherwise processed.

The computer system 400 may be in communication with, may include, or may not further include a display device 410, such as a liquid crystal display (LCD), an organic light emitting diode (OLED), a flat panel display, a solid state display, a cathode ray tube (CRT), a projector, a printer or other now known or later developed display device for outputting determined information. The display 410 may act as an interface for the user to see the functioning of the processor 402, or specifically as an interface with the software stored in the memory 404 or in the drive device 416.

The computer system 400 may include an input device 412 configured to allow a user to interact with any of the components of computer system. The input device 412 may be a keypad, a keyboard, or a cursor control device, such as a mouse, or a joystick, touch screen display, remote control or any other device operative to interact with the computer system 400. For example, a user of a navigation system may input criteria or conditions to be considered by a navigation device in calculating a route using the input device 412.

The computer system 400 may include a disk or optical drive device 416. The disk drive device 416 may include a computer-readable medium 422 in which one or more sets of instructions 424 or software can be embedded. The instructions 424 may embody one or more of the methods or logic described herein, including aspects of the NS 425. The instructions 424 may reside completely, or partially, within the memory 404 or within the processor 402 during execution by the computer system 400. The memory 404 and the processor 402 also may include computer-readable media as discussed above.

The computer system 400 may include computer-readable medium that may include instructions 424 or receives and executes instructions 424 responsive to a propagated signal so that a device connected to a network 426 can communicate voice, video, audio, images or any other data over the network 426. The instructions 424 may be transmitted or received over the network 426 via a communication port or interface 420, or using a bus 408. The communication port or interface 420 may be a part of the processor 402 or may be a separate component. The communication port 420 may be created in software or may be a physical connection in hardware. The communication port 420 may be configured to connect with a network 426, external media, the display 410, or any other components in the computer system 400, or combinations thereof.

The term "computer-readable medium" may include a single storage medium or multiple storage media, such as a centralized or distributed database, or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In alternative examples, dedicated hardware implementations, such as application specific integrated circuits, programmable logic arrays and other hardware devices, may be constructed to implement various aspects of the NS. One or more examples described may implement functions using two or more specific interconnected hardware modules or devices with related control and data signals that can be communicated between and through modules, or as portions of an application-specific integrated circuit. The NS may encompass software, firmware, and hardware implementations.

The NS described may be implemented by software programs executable by a computer system. Implementations can include distributed processing, component/object distributed processing, and parallel processing. Alternatively, virtual computer system processing can be constructed to implement various aspects of the NS.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments of the NS have been described, it may be apparent to those of ordinary skill in the art that many more embodiments and implementations are possible within the scope of the invention. For example, much of the above description presents aspects utilized by navigation systems, such as navigation systems of a vehicle; however, other types of systems may utilize these aspects and other aspects of the NS as well. Accordingly, the invention is not to be restricted except in light of the attached claims and their equivalents.

I claim:

1. A method for navigating along a route determined by an electronic navigation system, the method comprising:
   determining, via a processor, one or more junctions located between a first position of the electronic navigation system along the determined route and a maneuver point along the determined route;
   generating a first set of one or more explicit notifications, each explicit notification corresponding to a respective one of the one or more junctions and indicating that a user should not turn at a corresponding junction;
   determining a second position of the electronic navigation system along the determined route;

updating, based on the second position of the electronic navigation system, the first set of one or more explicit notifications to produce a second set of explicit notifications; and outputting for display a map including the determined route, the first set of the one or more explicit notifications, and the second set of explicit notifications.

2. The method of claim 1, wherein the navigation system includes a display coupled with the processor, the method further comprising:
displaying the first set of the one or more explicit notifications using the display, each explicit notification represented by a graphical symbol on the map; and
displaying the second set using the display.

3. The method of claim 2, wherein the first set includes a plurality of explicit notifications corresponding to a plurality of determined junctions.

4. The method of claim 2, further comprising displaying, using the display, at least one of the maneuver point and a maneuver instruction corresponding to the maneuver point on the map.

5. The method of claim 3, wherein updating the first set to produce the second set includes adding at least one explicit notification to the first set of one or more explicit notifications.

6. The method of claim 4, further comprising:
determining, based on the second position of the electronic navigation system, that the user has passed one of the one or more junctions,
wherein updating the first set includes removing the explicit notification corresponding to the passed junction.

7. The method of claim 5, wherein the first and second sets are limited by a predetermined number of explicit notifications.

8. The method of claim 6, wherein each of the one or more junctions represents an incorrect turn along the determined route prior to a turn corresponding to the maneuver point.

9. A non-transitory computer-readable storage medium having computer-readable program code embodied therewith, the computer-readable program code executable by one or more computer processors to perform an operation for navigation along a route, by performing the steps of:
determining one or more junctions located between a first position of the electronic navigation system along the determined route and a maneuver point along the determined route;
generating a first set of one or more explicit notifications, each explicit notification corresponding to a respective one of the one or more junctions and indicating that the user should not turn at a corresponding junction;
determining a second position of the electronic navigation system along the determined route;
updating, based on the second position of the electronic navigation system, the first set of one or more explicit notifications to produce a second set of explicit notifications; and
outputting for display a map including the determined route, the first set of the one or more explicit notifications, and the second set of explicit notifications.

10. The computer program product of claim 9, wherein the operation further includes:
displaying, using a display coupled with the one or more computer processors, the first set of the one or more explicit notifications, each explicit notification represented by a graphical symbol on a map; and
displaying the second set using the display.

11. The computer program product of claim 9, wherein the first set includes a plurality of explicit notifications corresponding to a plurality of junctions.

12. The computer program product of claim 10, wherein the operation further includes displaying at least one of the maneuver point and a maneuver instruction corresponding to the maneuver point on the map.

13. The computer program product of claim 9, wherein updating the first set to produce the second set includes adding at least one explicit notification to the first set of one or more explicit notifications.

14. The computer program product of claim 9, wherein the operation further includes:
determining, based on the second position of the electronic navigation system, that the user has passed one of the one or more junctions,
wherein updating the first set includes removing the explicit notification corresponding to the passed junction.

15. The computer program product of claim 9, wherein the first and second sets are limited by a predetermined number of explicit notifications.

16. The computer program product of claim 9, wherein each of the one or more junctions represents an incorrect turn along the route prior to a turn corresponding to the maneuver point.

17. A method for navigating along a route determined by an electronic navigation system, the method comprising:
determining, via a processor, one or more junctions located between a first position of the electronic navigation system along the determined route and a maneuver point along the determined route, each junction representing an incorrect turn along the determined route prior to a turn corresponding to the maneuver point;
generating a first set of one or more first explicit notifications, each explicit notification corresponding to a respective one of the one or more junctions and indicating that a user should not turn at a corresponding junction; and
outputting the first set of the one or more explicit notifications using an output device coupled with the processor.

18. The method of claim 17, wherein outputting the first set of the one or more explicit notifications includes:
a visual output, wherein each explicit notification of the first set is represented by a graphical symbol on a map,
an audible output, and
a tactile output.

19. The method of claim 17, further comprising:
updating, based on a second position of the electronic navigation system along the determined route, the first set of one or more first explicit notifications to produce a second set; and
outputting the second set.

20. The method of claim 19, further comprising:
determining, based on the second position of the electronic navigation system and a direction of travel along the determined route, that the user has passed one of the one or more junctions,
wherein updating the composition of the first set includes removing the explicit notification corresponding to the passed junction.

21. The method of claim 1, further comprising:
determining, based on the second position of the electronic navigation system, that the user has passed one of the one or more junctions, wherein updating the first set includes changing a color of the explicit notification corresponding to the passed junction.

22. The method of claim 1, further comprising:

determining, based on the second position of the electronic navigation system, that the user has passed one of the one or more junctions, wherein updating the first set includes changing a size of the explicit notification corresponding to the passed junction.

* * * * *